(12) United States Patent
Takaishi et al.

(10) Patent No.: US 10,583,896 B2
(45) Date of Patent: Mar. 10, 2020

(54) FUEL COMPOSITION, SHIP, AND AUTOMATIC FUEL COMPOSITION-SWITCHING SYSTEM

(71) Applicant: Oshima Shipbuilding Co., Ltd., Nagasaki (JP)

(72) Inventors: Tatsuo Takaishi, Nagasaki (JP); Koji Takasaki, Fukuoka (JP)

(73) Assignee: Oshima Shipbuilding Co., Ltd., Nagasaki (JP)

( * ) Notice: Subject to any disclaimer, the term of this patent is extended or adjusted under 35 U.S.C. 154(b) by 0 days.

(21) Appl. No.: 15/753,906

(22) PCT Filed: Jul. 13, 2016

(86) PCT No.: PCT/JP2016/070679
§ 371 (c)(1),
(2) Date: Feb. 20, 2018

(87) PCT Pub. No.: WO2017/029913
PCT Pub. Date: Feb. 23, 2017

(65) Prior Publication Data
US 2018/0251194 A1 Sep. 6, 2018

(30) Foreign Application Priority Data
Aug. 20, 2015 (JP) ................... 2015-163229

(51) Int. Cl.
*B63B 11/04* (2006.01)
*F02M 25/022* (2006.01)
(Continued)

(52) U.S. Cl.
CPC .......... *B63B 11/04* (2013.01); *B63B 17/0027* (2013.01); *B63B 49/00* (2013.01);
(Continued)

(58) Field of Classification Search
CPC ..... B63B 11/04; B63B 17/0027; B63H 21/38; C10L 10/02; C10L 1/328; F02D 41/0025; F02M 25/0228
See application file for complete search history.

(56) References Cited

U.S. PATENT DOCUMENTS 5,863,301 A * 1/1999 Grosso ................ C10L 1/328
137/13
6,325,833 B1 12/2001 Berlowitz et al.
(Continued)

FOREIGN PATENT DOCUMENTS

JP  H08246961 A  9/1996
JP  H09317587 A  12/1997
(Continued)

*Primary Examiner* — Stephen P Avila
(74) *Attorney, Agent, or Firm* — Morgan, Lewis & Bockius LLP

(57) ABSTRACT

Provided is a fuel composition prepared by adding gas-to-liquid oil and water to light cycle oil to conduct emulsification. The fuel composition is used as a fuel for a diesel engine (12) in a ship (10). The ship (10) includes a fresh water tank (15), an LCO tank (13), and a GTL tank (14) configured to store water, light cycle oil, and gas-to-liquid oil, respectively, and a mixer (16) configured to mix the water, the light cycle oil, and the gas-to-liquid oil fed from the respective tanks to produce the fuel composition.

19 Claims, 4 Drawing Sheets

(51) Int. Cl.
  *B63B 17/00* (2006.01)
  *F02D 41/00* (2006.01)
  *C10L 10/02* (2006.01)
  *B63B 49/00* (2006.01)
  *B63H 21/38* (2006.01)
  *C10L 1/32* (2006.01)
  *F02D 19/08* (2006.01)
  *F02D 19/06* (2006.01)
  *F02D 19/12* (2006.01)

(52) U.S. Cl.
  CPC .............. *B63H 21/38* (2013.01); *C10L 1/328* (2013.01); *C10L 10/02* (2013.01); *F02D 41/0025* (2013.01); *F02M 25/0227* (2013.01); *F02M 25/0228* (2013.01); *C10L 2200/0295* (2013.01); *C10L 2200/0446* (2013.01); *C10L 2200/0461* (2013.01); *C10L 2200/0492* (2013.01); *C10L 2270/026* (2013.01); *F02D 19/0657* (2013.01); *F02D 19/082* (2013.01); *F02D 19/12* (2013.01)

(56) References Cited

U.S. PATENT DOCUMENTS

2004/0194367 A1\* 10/2004 Clark ..................... C10L 1/328
  44/301
2012/0167451 A1\* 7/2012 Festuccia .................. C10L 1/02
  44/307

FOREIGN PATENT DOCUMENTS

| JP | 2001158890 A | 6/2001 |
| JP | 2001515950 A | 9/2001 |
| JP | 2006506481 A | 2/2006 |
| JP | 2014224872 A | 12/2014 |
| WO | WO 2014104103 A1 | 7/2014 |

\* cited by examiner

[FIG. 1]
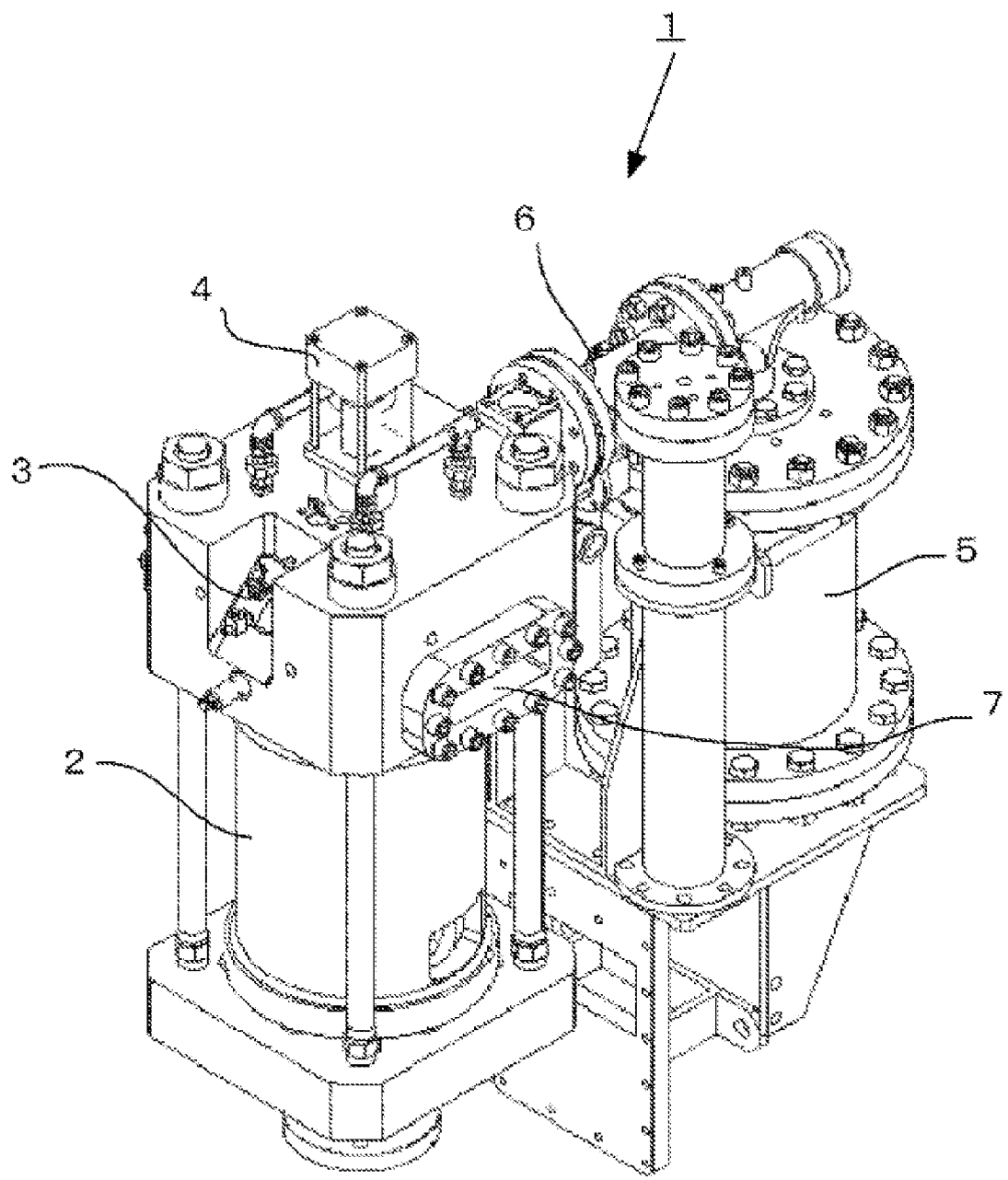

[FIG. 2]
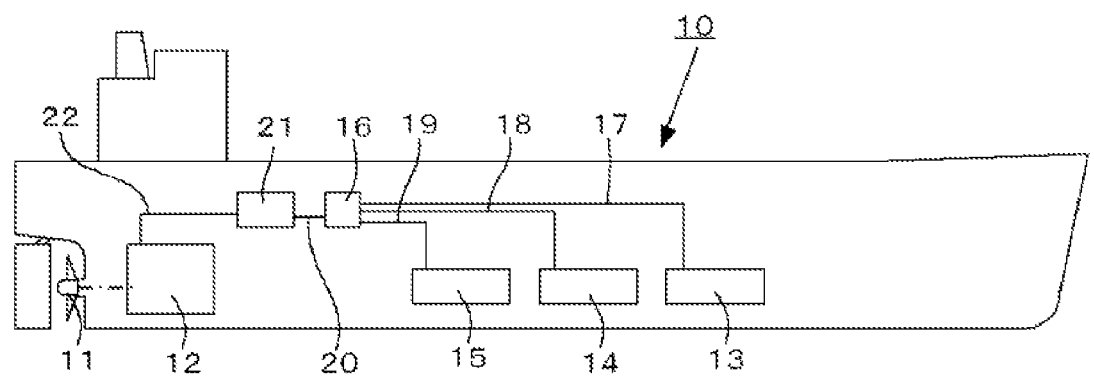
[FIG. 3]
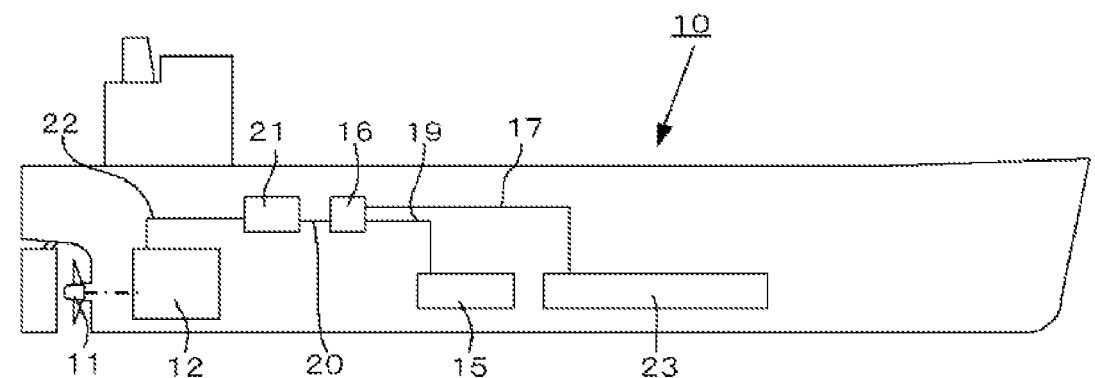

[FIG. 4]
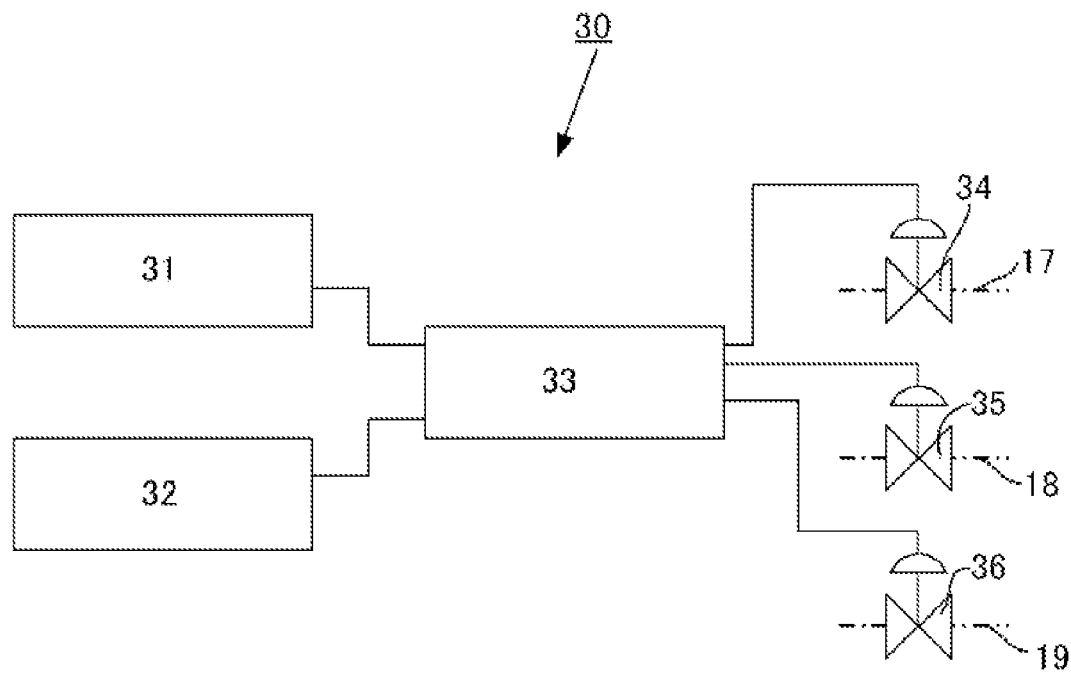
[FIG. 5]
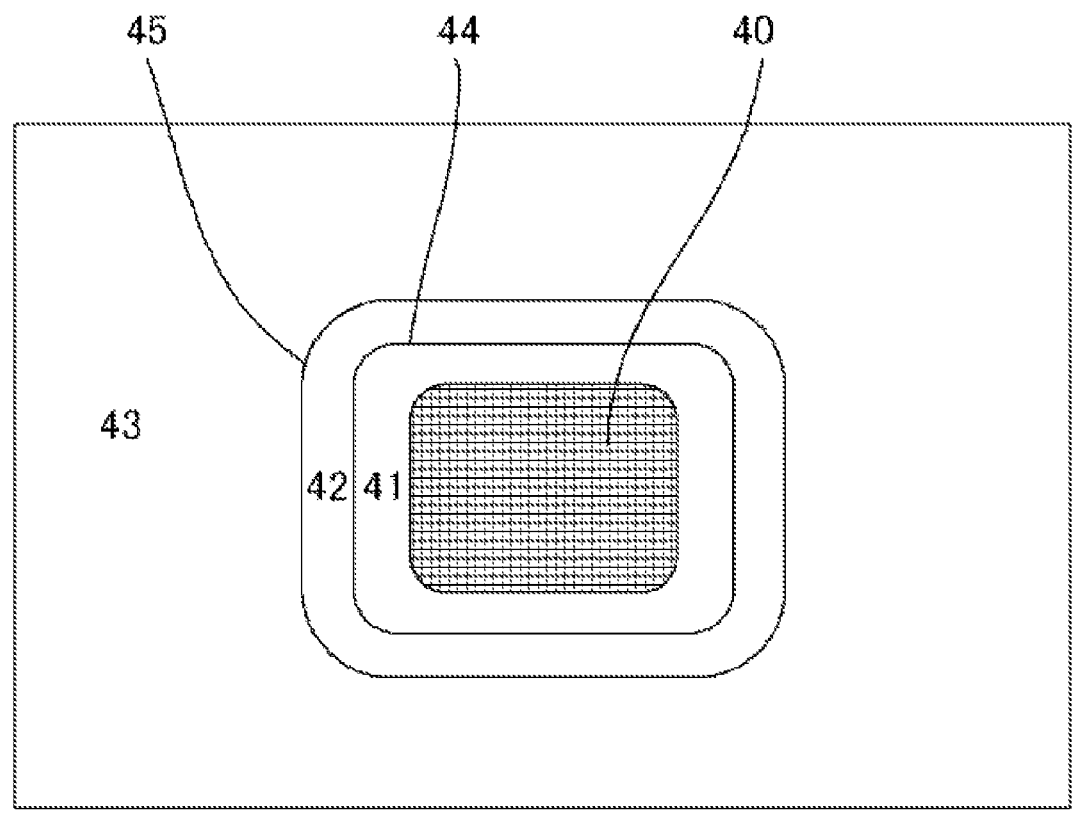

[FIG. 6]
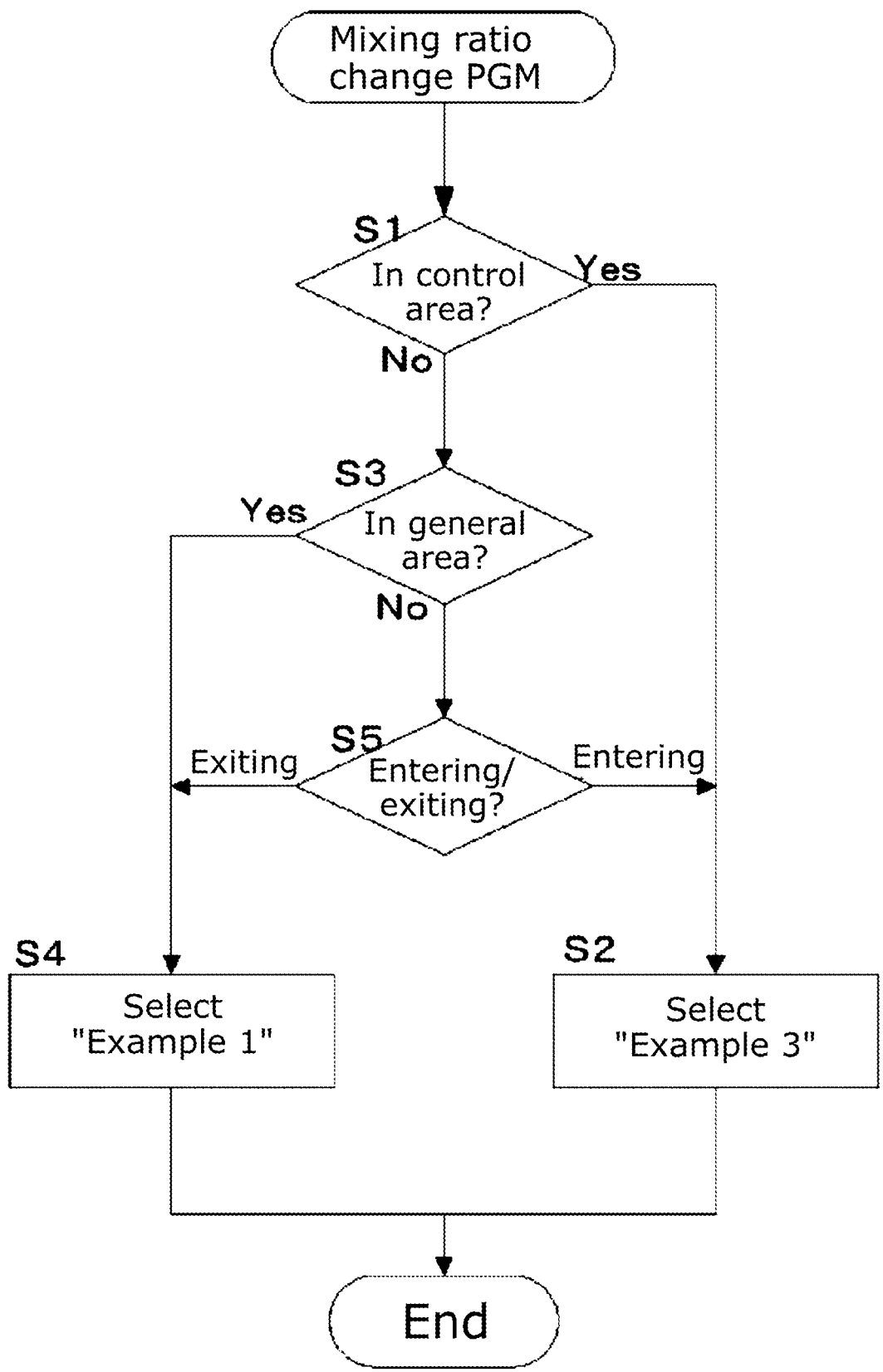

FUEL COMPOSITION, SHIP, AND AUTOMATIC FUEL COMPOSITION-SWITCHING SYSTEM

TECHNICAL FIELD

The present invention relates to a fuel composition, a ship, and an automatic fuel composition-switching system.

BACKGROUND ART

Conventionally, heavy fuel oil has been widely used as a marine fuel. However, emission control for sulfur oxides (SOx) is increasingly strengthened in recent years, and areas in which use of the heavy fuel oil, which is sulfur-rich, as a marine fuel is acceptable are becoming narrower. Moreover, use of the heavy fuel oil as a marine fuel is expected to become completely impractical in the near future.

In such circumstances, light cycle oil (LCO), which has a low sulfur content, has been received attention as an alternative marine fuel to the heavy fuel oil (e.g., Patent Document 1). LCO refers to fractions having higher boiling points than gasoline among fractions obtained by allowing vacuum gas oil or residual oil to pass through a fluid catalytic cracker (FCC), in other words, lighter fractions (boiling point range: around 220 to 430° C.) among cracked gas oils, and is also called "cracked light gas oil". Since LCO has a low sulfur content, use of LCO as a marine fuel advantageously leads to reduction of the amount of SOx emitted from ships.

In addition, the amount of nitrogen oxides (NOx) emitted from ships is controlled. Use of an emulsion fuel obtained by mixing a fuel oil and water as a fuel for a diesel engine is known as a method for reducing the amount of NOx emitted (Patent Document 2). An emulsion fuel generates a reduced amount of NOx formed (emitted) because the combustion temperature of the emulsion fuel is lower than that when a fuel oil is directly burned.

However, an emulsion fuel generally has low ignitability, and hence has the problem of ignition delay and the resulting frequent occurrence of abnormal vibration for diesel engines. Patent Document 3 discloses, as a solution to this problem, a diesel engine including a pilot injector configured to inject an auxiliary fuel having a high Cetane number such as marine diesel oil prior to injection of an emulsion fuel.

CITATION LIST

Patent Documents

Patent Document 1: Japanese Patent Application Laid-Open No. 2001-158890
Patent Document 2: Japanese Patent Application Laid-Open No. 2014-221872
Patent Document 3: Japanese Patent Application Laid-Open No. 08-246961

SUMMARY OF INVENTION

Technical Problem

Use of an emulsion fuel obtained by mixing LCO and water as a marine fuel is expected to enable simultaneous reduction of the amounts of SOx and NOx emitted from ships. However, an emulsion fuel obtained by mixing LCO and water has the problem of even lower ignitability than a common emulsion fuel because LCO has a low Cetane number. For this reason, an emulsion fuel obtained by mixing LCO and water is hard to use as a main fuel for diesel engines. In particular, an emulsion fuel obtained by mixing LCO and water is hard to use for conventional diesel engines including no pilot injector.

The present invention was made in view of such circumstances, and an object of the present invention is to provide a fuel composition obtained by mixing LCO and water, the fuel composition being applicable to diesel engines including no pilot injector. Another object of the present invention is to provide a ship with low emission of sulfur oxides and nitrogen oxides. Still another object of the present invention is to provide a system configured to automatically select a fuel composition according to an area where a ship is located to feed the fuel composition to the main engine of the ship.

Solution to Problem

To achieve the above object, the fuel composition according to the present invention is prepared by adding gas-to-liquid oil and water to light cycle oil to conduct emulsification.

In the above fuel composition, the content of the gas-to-liquid oil may be 30% or more based on the total mass of the light cycle oil and the gas-to-liquid oil.

In the above fuel composition, the content of the water may be 50% or more based on the total mass of the light cycle oil and the gas-to-liquid oil.

In the above fuel composition, the content of the water may be 70% or more based on the total mass of the light cycle oil and the gas-to-liquid oil.

The ship according to the present invention uses any of the above fuel compositions as a fuel for a propulsion engine.

The above ship may include: tanks configured to store water, light cycle oil, and gas-to-liquid oil, respectively; and a mixer configured to mix the water, the light cycle oil, and the gas-to-liquid oil fed from the respective tanks to produce the fuel composition.

The above ship may include: a tank configured to store water; a tank configured to store a mixed oil prepared by mixing light cycle oil and gas-to-liquid oil; and a mixer configured to mix the water and the mixed oil fed from the respective tanks to produce the fuel composition.

The automatic fuel composition-switching system according to the present invention includes: an electronic chart unit storing control area boundary information indicating a location of a border between a control area where emission of air pollutants is more strictly controlled than in a non-control area, and a non-control area; a position information acquisition unit configured to acquire information on the current position of the ship; and a mixing ratio changer configured to select a first fuel composition at least complying with emission control for air pollutants in the control area or a second fuel composition acceptable for use in the non-control area and form the selected fuel composition in the mixer by changing the mixing ratio of a raw material oil and water in the mixer. Further, the mixing ratio changer is configured to compare information on the current position of the ship acquired by the position information acquisition unit and the control area boundary information stored in the electronic chart unit, and form the first fuel composition in the mixer in a case where the ship is located in the control area and form the second fuel composition in the mixer in a case where the ship is located in the non-control area.

The above mixing ratio changer may be configured to change a fuel composition formed in the mixer to the first fuel composition before the ship enter the control area when the ship is to move from the non-control area into the control area, and to the second fuel composition after the ship exits the control area when the ship is to move from the control area to the non-control area.

The ship according to the present invention includes any of the above automatic fuel composition-switching systems installed therein.

Advantageous Effects of Invention

The fuel composition according to the present invention contains light cycle oil as a primary component, and hence has a low sulfur content and the amount of sulfur oxides emitted therefrom in combustion is small. Since the fuel composition according to the present invention is prepared by adding water to light cycle oil to conduct emulsification, the combustion temperature can be lowered and the amount of nitrogen oxides emitted in combustion can be reduced. The fuel composition according to the present invention has improved ignitability by virtue of the gas-to-liquid oil contained therein. For this reason, when the fuel composition according to the present invention is used as a fuel for a diesel engine, installation of a unit for pilot injection of a fuel having a high Cetane number into the diesel engine is not required. That is, the present invention provides a fuel with low emission of sulfur oxides and nitrogen oxides, the fuel being applicable to conventional diesel engines including no pilot injector.

The ship according to the present invention uses the above fuel composition for a propulsion engine, and hence can comply with emission control for SOx and NOx on ships with ease. Accordingly, the present invention can provide a ship free from limitation of areas to cruise with ease.

The automatic fuel composition-switching system according to the present invention can select a fuel composition according to an area where a ship is located and control the ship to use the fuel composition. For example, the automatic fuel composition-switching system according to the present invention can select and control the ship to use a fuel composition with low emission of air pollutants when the ship is cruising in an area where emission of air pollutants is strictly controlled, and a relatively inexpensive fuel composition when the ship is cruising out of the area. Hence, environmental conservation and economic efficiency can be simultaneously achieved in a ship.

BRIEF DESCRIPTION OF DRAWINGS

FIG. 1 is a perspective view illustrating the outer shape of a RCEM for a combustion test for the fuel composition according to one aspect of the present invention.

FIG. 2 is a conceptual diagram illustrating the configuration of the ship according to one aspect of the present invention.

FIG. 3 is a conceptual diagram illustrating the configuration of the ship according to one aspect of the present invention as another embodiment.

FIG. 4 is a conceptual diagram illustrating the hardware configuration of the automatic fuel composition-switching system according to one aspect of the present invention.

FIG. 5 is a conceptual diagram illustrating the concepts of a control area, a global area, and a preparation area.

FIG. 6 is a flow chart illustrating a process by a mixing ratio change program according to one aspect of the present invention.

DESCRIPTION OF EMBODIMENTS

Hereinafter, embodiments of the fuel composition according to the present invention will be described in detail with reference to the drawings, as necessary. It should be noted that an identical reference sign is used for identical or equivalent parts in the drawings.

(Combustion Test)

To examine the performance of the fuel composition according to the present invention, the following six fuels were each subjected to a combustion test by using a rapid compression and expansion machine (RCEM) to simulate combustion in a combustion chamber of a diesel engine.

Example 1

Water emulsion fuel prepared by mixing 70% by mass of light cycle oil (LCO), 30% by mass of gas-to-liquid oil (GTL), and 50% by mass of water.

Example 2

Water emulsion fuel prepared by mixing 70% by mass of light cycle oil (LCO), 30% by mass of gas-to-liquid oil (GTL), and 70% by mass of water.

Example 3

Water emulsion fuel prepared by mixing 50% by mass of light cycle oil (LCO), 50% by mass of gas-to-liquid oil (GTL), and 100% by mass of water.

Comparative Example 1

Water emulsion fuel prepared by mixing 100% by mass of light cycle oil (LCO) and 100% by mass of water.

Comparative Example 2

Water emulsion fuel prepared by mixing 100% by mass of light cycle oil (LCO) and 120% by mass of water.

Comparative Example 3

Single configuration of gas oil (GO).

Comparative Example 4

Single configuration of light cycle oil (LCO).

(Light Cycle Oil)

Light cycle oil (LCO) refers to fractions having higher boiling points than gasoline among fractions obtained by allowing vacuum gas oil or residual oil to pass through a fluid catalytic cracker and contact a catalyst, in other words, lighter fractions (boiling point range: around 220 to 430° C.) among cracked gas oils. Light cycle oil is also called "cracked light gas oil".

(Gas-to-Liquid Oil)

Gas-to-liquid oil is a kind of artificial petroleum obtained in a series of processes in which hydrocarbon gas having a few, about one to several carbon atoms as a raw material is subjected to Fischer-Tropsch reaction to temporarily synthesize a large hydrocarbon molecule including up to 100 or more carbon atoms linked together, and then the number of carbon atoms is reduced to about 11 to 15 through a hydrocracking process. In addition, gas-to-liquid oil is abbreviated as GTL.

(Gas Oil)

Gas oil (GO), which is a traditional diesel fuel, is a hydrocarbon mixture having a boiling point range of about 180 to 350° C., and obtained through distillation of a crude oil. Gas oil is also called "light oil".

(Characteristics of Raw Material Oils)

The characteristics of the raw material oils constituting each fuel used in combustion tests, namely, the light cycle oil (LCO), the gas-to-liquid oil (GTL), and the gas oil (GO) are as shown in Table 1.

TABLE 1

| Raw material oil | LCO | GTL | GO |
|---|---|---|---|
| Density (kg/m$^3$) | 893 | 784 | 860 |
| Lower heating value (MJ/kg) | 41.1 | 43.6 | 43.1 |
| Lower heating value (MJ/m$^3$) | 36702 | 34182 | 37066 |
| Cetane number | 2-30 | 87.8 | 45-55 |
| Carbon content (wt %) | 89.4 | 84.8 | 86.4 |
| Hydrogen content (wt %) | 10.6 | 15.1 | 13.5 |
| Total aromatic content (vol %) | 73.5 | <0.1 | 20.9 |

(RCEM)

FIG. 1 is a perspective view illustrating the outer shape of the RCEM for a combustion test for each of the fuels of Example 1 to Comparative Example 4. The RCEM 1 is a one-shot firing machine to simulate a combustion chamber of a diesel engine, and includes a cylinder 2 as illustrated in FIG. 1. In the inside of the cylinder 2, a piston not illustrated is disposed. The piston is jointed to a crankshaft not illustrated via a connecting rod not illustrated, and the crankshaft is rotationally driven by a driving source not illustrated. When the crankshaft rotates, the piston moves up and down in the cylinder 2. A fuel injection valve 3 and an intake valve 4 are disposed above the cylinder 2. The fuel injection valve 3 is connected to a fuel pump not illustrated, and the fuel pressurized by the fuel pump is injected into the cylinder 2 when the fuel injection valve 3 is opened.

The intake valve 4 is connected to a compressed air tank 5. The compressed air tank 5 stores high pressure air compressed by an air compressor not illustrated, and the high pressure air stored in the compressed air tank 5 flows into the cylinder 2 when the intake valve 4 is opened. A heater not illustrated is disposed in the inside of a pipeline 6 linking the compressed air tank 5 and the intake valve 4, and the high pressure air flowing into the cylinder 2 is warmed by the heater. Here, the compressed air tank 5 and the heater not illustrated together correspond to a unit to simulate a supercharger. The high pressure air fed from the compressed air tank 5, warmed in the inside of the pipeline 6, and flowing through the intake valve 4 into the cylinder 2 corresponds to air adiabatically compressed in a supercharger.

In this manner, the RCEM 1 can simulate the combustion of a fuel in a combustion chamber of a diesel engine with a supercharger. An inspection window 7 is provided in the side surface of the cylinder 2, and flame of combustion in the cylinder 2 can be observed through the inspection window 7.

The basic specification of the RCEM 1 is as follows. Stroke: 260 mm Compression ratio: 10.4 Rotational speed: 360 rpm Experiment Conditions The initial pressure and initial temperature in combustion tests, specifically, the pressure and temperature of air taken through the intake valve 4 into the cylinder 2 were 0.56 MPa and 90° C., respectively. The compression pressure and compression temperature, specifically, the pressure and temperature of air in the cylinder 2 when the piston was at the top dead center were 10 MPa and 530° C., respectively. The fuel injection valve 3 was set so as to be opened when the piston was at 9° (crank angle) before the top dead center and be closed when the piston descended by 13° (crank angle) from the top dead center. In other words, the fuel injection valve 3 was set so that the fuel injection valve 3 was opened and the fuel was injected into the cylinder 2 during the crank angle was between −9° and +13° as the crank angle when the piston was at the top dead center was defined as 0°.

Example 1

As described above, the fuel composition of Example 1 is water emulsion fuel prepared by mixing 70% by mass of the light cycle oil (LCO), 30% by mass of the gas-to-liquid oil (GTL), and 50% by mass of water. In other words, the fuel composition of Example 1 is water emulsion fuel prepared by mixing the LCO, the GTL, and water at a mass ratio of 7:3:5. When the fuel composition of Example 1 was subjected to a combustion test by using the RCEM 1 under the above conditions (then, the injection nozzle hole diameter and injection pressure of the fuel injection valve 3 were 0.6 mm and 123.2 MPa, respectively), auto-ignition was found at a crank angle of around −2.5°. From this result, ignitability sufficient as a diesel fuel was confirmed.

Example 2

The fuel composition of Example 2 is water emulsion fuel prepared by mixing 70% by mass of the light cycle oil (LCO), 30% by mass of the gas-to-liquid oil (GTL), and 70% by mass of water. In other words, the fuel composition of Example 2 is water emulsion fuel prepared by mixing the LCO, the GTL, and water at a mass ratio of 7:3:7. When the fuel composition of Example 2 was subjected to a combustion test by using the RCEM 1 under the above conditions (then, the injection nozzle hole diameter and injection pressure of the fuel injection valve 3 were 0.6 mm and 141.9 MPa, respectively), auto-ignition was found at a crank angle of around −1.2°. From this result, ignitability sufficient as a diesel fuel was confirmed.

Example 3

The fuel composition of Example 3 is water emulsion fuel prepared by mixing 50% by mass of the light cycle oil (LCO), 50% by mass of the gas-to-liquid oil (GTL), and 100% by mass of water. In other words, the fuel composition of Example 3 is water emulsion fuel prepared by mixing the LCO, the GTL, and water at a mass ratio of 5:5:10. When the fuel composition of Example 3 was subjected to a combustion test by using the RCEM 1 under the above conditions (then, the injection nozzle hole diameter and injection pressure of the fuel injection valve 3 were 0.8 mm and 101.3 MPa, respectively), auto-ignition was found at a crank angle of around −1.7°. From this result, ignitability sufficient as a diesel fuel was confirmed.

Comparative Example 1

The fuel composition of Comparative Example 1 is water emulsion fuel prepared by mixing 100% by mass of the light cycle oil (LCO) and 100% by mass of water. In other words, the fuel composition of Comparative Example 1 is water emulsion fuel prepared by mixing the LCO and water at a mass ratio of 10:10. When the fuel composition of Comparative Example 1 was subjected to a combustion test by using the RCEM 1 under the above conditions, auto-ignition was not found. In light of this result, the gas-to-liquid oil (GTL) was injected in a short period at a crank angle of around −9°, in other words, pilot injection of the gas-to-liquid oil (GTL) was performed, and then the gas-to-liquid oil (GTL) ignited and subsequently the fuel composition of Comparative Example 1 ignited. Thus, pilot injection of a fuel having a high Cetane number is required when the fuel composition of Comparative Example 1 is used as a diesel fuel.

Comparative Example 2

The fuel composition of Comparative Example 2 is water emulsion fuel prepared by mixing 100% by mass of the light cycle oil (LCO) and 120% by mass of water. In other words, the fuel composition of Comparative Example 2 is water emulsion fuel prepared by mixing the LCO and water at a mass ratio of 10:12. With the expectation that the fuel composition of Comparative Example 2 would not undergo auto-ignition in light of the test result for the fuel composition of Comparative Example 1, the gas-to-liquid oil (GTL) was injected in a short period at a crank angle of around −9°, in other words, pilot injection of the gas-to-liquid oil (GTL) was performed, and then the gas-to-liquid oil (GTL) ignited and subsequently the fuel composition of Comparative Example 2 ignited. Then, the injection nozzle hole diameter and injection pressure of the fuel injection valve 3 were 0.8 mm and 85.7 MPa, respectively. Thus, pilot injection of a fuel having a high Cetane number is required when the fuel composition of Comparative Example 2 is used as a diesel fuel.

Comparative Example 3

The fuel of Comparative Example 3 is single configuration of the gas oil (GO). When the fuel of Comparative Example 3 was subjected to a combustion test by using the RCEM 1 under the above conditions (then, the injection nozzle hole diameter and injection pressure of the fuel injection valve 3 were 0.5 mm and 93.9 MPa, respectively), auto-ignition was found at a crank angle of around −6°. From this result, the fuel of Comparative Example 3 was confirmed to be applicable as a diesel fuel.

Comparative Example 4

The fuel of Comparative Example 4 is single configuration of the light cycle oil (LCO). When the fuel of Comparative Example 4 was subjected to a combustion test by using the RCEM 1 under the above conditions (then, the injection nozzle hole diameter and injection pressure of the fuel injection valve 3 were 0.5 mm and 101.8 MPa, respectively), auto-ignition was found at a crank angle of around −2.5°. From this result, the fuel of Comparative Example 4 was confirmed to be applicable as a diesel fuel.

(Component Analysis for Exhaust Gas)

The exhaust gas obtained in the combustion test for each of Example 1 to Comparative Example 4 was subjected to component analysis, and results shown in Table 2 were obtained.

TABLE 2

| Pollutant | Example 1 | Example 2 | Example 3 | Comparative Example 1 | Comparative Example 2 | Comparative Example 3 | Comparative Example 4 |
| --- | --- | --- | --- | --- | --- | --- | --- |
| Carbon monoxide (ppm) | 56 | 71 | 108 | 49 | 88 | 12 | 23 |
| Hydrocarbons (ppm) | 28 | 20 | 45 | 33 | 59 | 28 | 26 |
| Nitrogen oxides (ppm) | 239 | 179 | 100 | 126 | 60 | 317 | 418 |

As shown in Table 2, while the concentration of nitrogen oxides (NOx) in the exhaust gas from combustion of the light cycle oil (LCO) as it is in the diesel engine (Comparative Example 4) is 418 ppm, the concentration of nitrogen oxides (NOx) in the exhaust gas from combustion of the fuel composition in the diesel engine is 239 ppm for Example 1, 179 ppm for Example 2, and 100 ppm for Example 3. It follows that use of the fuel composition as a diesel fuel advantageously leads to reduction of the concentration of nitrogen oxides (NOx) in the exhaust gas by approximately 43% for Example 1, approximately 57% for Example 2, and approximately 76% for Example 3 from that in a case where single configuration of the light cycle oil (LCO) is used as diesel engine.

The concentration of nitrogen oxides (NOx) in the exhaust gas from combustion of the gas oil (GO), which is a traditional diesel fuel, as it is in the diesel engine (Comparative Example 3) is 317 ppm. Thus, use of the fuel composition as a diesel fuel advantageously leads to reduction of the concentration of nitrogen oxides (NOx) in the exhaust gas by approximately 25% for Example 1, approximately 44% for Example 2, and approximately 68% for Example 3 from that in a case where single configuration of the gas oil (GO) is used as a diesel fuel.

As seen above, each of the fuel compositions of Examples 1 to 3 can be used as a main fuel for common diesel engines (diesel engines including no pilot injector). The concentration of nitrogen oxides (NOx) in the exhaust gas from combustion of any of the fuel compositions of Examples 1 to 3 in a diesel engine is significantly lower than that in the case of combustion of a conventional fuel (Comparative Example 3 or 4) in a diesel engine.

The fuel compositions of Comparative Examples 1 and 2 are poor in ignitability, and hence a pilot injector is required for a diesel engine in use of them as a main fuel for the diesel engine. Though, it can be seen from the experiment results that the concentration of nitrogen oxides (NOx) in the exhaust gas is lower than those for Examples 1 and 2.

(Ship)

Use of the fuel composition according to the present invention as a main fuel for a propulsion engine in a ship advantageously leads to reduction of the amount of nitrogen oxides (NOx) emitted from the ship. If the amount of nitrogen oxides (NOx) emitted is reduced below the regulatory limit of the amount emitted, the ship can avoid limitation of areas to cruise. Reduction of the amount of nitrogen oxides (NOx) emitted, even if the amount emitted is over the regulatory limit of the amount emitted, allows use of a unit for removal of nitrogen oxides (NOx) in the exhaust gas (denitrator) with a smaller capacity, and hence the construction cost and operation cost for the ship can be reduced.

FIG. 2 is a conceptual diagram illustrating the configuration of the ship 10 according to one aspect of the present invention. As illustrated in FIG. 2, the ship 10 includes a propeller 11 and a diesel engine 12 to rotationally drive the propeller 11. Since the ship 10 is propelled by the thrust produced by the propeller 11 rotationally driven, the diesel engine 12 corresponds to a propulsion engine of the ship 10. The ship 10 further includes an LCO tank 13 to store light cycle oil (LCO), a GTL tank 14 to store gas-to-liquid oil (GTL), a fresh water tank 15 to store fresh water, and a mixer 16 to produce water emulsion fuel (e.g., the fuel composition of Example 1).

The mixer 16 is communicating with the LCO tank 13, the GTL tank 14, and the fresh water tank 15 via pipelines 17, 18, and 19, respectively, each with a pump not illustrated. Light cycle oil (LCO), gas-to-liquid oil (GTL), and fresh water stored in the LCO tank 13, the GTL tank 14, and the fresh water tank 15, respectively, are fed into the mixer 16 through the pipelines 17, 18, and 19, respectively. The mixer 16 mixes and stirs them to produce water emulsion fuel. The water emulsion fuel produced in the mixer 16 is fed into a buffer tank 21 through a pipeline 20, and temporarily stored therein. The water emulsion fuel temporarily stored in the buffer tank 21 is fed into the diesel engine 12 through a pipeline 22, and used as a main fuel for the diesel engine 12. The buffer tank 21 is a tank for adjustment of the gap between the production rate of the water emulsion fuel in the mixer 16 and the consumption rate of the water emulsion fuel in the diesel engine 12. Further, a pump not illustrated is disposed in the middle of each of the pipelines 20 and 21. The diesel engine 12, the mixer 16, the pumps not illustrated, and so on, are each controlled by a controller not illustrated.

The ship 10 may be configured as illustrated in FIG. 3. Specifically, a mixed oil tank 23 may be included in place of the LCO tank 13 and the GTL tank 14. The mixed oil tank 23 is a tank to store a mixed oil produced in advance by mixing light cycle oil (LCO) and gas-to-liquid oil (GTL) in a plant on land. The ship 10 illustrated in FIG. 3 is different from the ship 10 illustrated in FIG. 2 in that the mixer 16 mixes and stirs the mixed oil fed from the mixed oil tank 23 and fresh water fed from the fresh water tank 15 to produce water emulsion fuel. There are no differences between the ship 10 illustrated in FIG. 2 and the ship 10 illustrated in FIG. 3 for the other configurations.

(Automatic Fuel Composition-Switching System)

Emission limitation for NOx and SOx differs among areas. In general, emission limitation is strictly imposed in coastal waters around the North American continent and the European continent, and emission control is lax in the other areas including open oceans. Hereinafter, an area where emission limitation for NOx and SOx is strictly imposed is referred to as "control area", and an area where the emission limitation is lax is referred to as "global area".

Since emission limitation for NOx and SOx is strictly imposed in a control area, it is required to use a fuel composition with low emission of NOx and SOx, such as the fuel composition of Example 3. In a global area, on the other hand, emission limitation for NOx and SOx is laxer than in a control area, and thus use of, for example, the fuel composition of Example 1 is acceptable. Since gas-to-liquid oil (GTL) is more expensive than light cycle oil (LCO), the fuel composition of Example 3 is more expensive than the fuel composition of Example 1.

In such circumstances, compliance with emission limitation in various areas and reduction of fuel cost can be simultaneously achieved through providing the ship 10 with an automatic fuel composition-switching system to automatically change the mixing ratio of a raw material oil (collective term for light cycle oil (LCO) and gas-to-liquid oil (GTL), herein) and water in the mixer 16 according to the area where the ship 10 is currently located. Hereinafter, the automatic fuel composition-switching system will be described in detail.

FIG. 4 is a conceptual diagram illustrating the hardware configuration of an automatic fuel composition-switching system 30. As illustrated in FIG. 4, the automatic fuel composition-switching system 30 is configured with an electronic chart unit 31, a position information acquisition unit 32, and a mixing ratio changer 33.

The electronic chart unit 31 is a unit composed by storing control area boundary information indicating a location of a border between a control area and a preparation area set outside of the control area and preparation area boundary information indicating a location of a border between the preparation area and a global area further outside of the preparation area, in a known apparatus configured to store computerized chart information and display it, as necessary. The control area boundary information and preparation area boundary information will be described in detail later.

The position information acquisition unit 32 is a geodetic device, for example, utilizing the GPS (Global Positioning System), and is configured to acquire the position on the earth at which the ship 10 is currently located on a real-time basis.

The mixing ratio changer 33 is an apparatus including a computer not illustrated, and configured to compare position information for the ship 10 input from the position information acquisition unit 32 with the control area boundary information and preparation area boundary information stored in the electronic chart unit 31, and change the mixing ratio of a raw material oil and water in the mixer 16 according to the current position of the ship 10. The pipelines 17 to 19 include regulation valves 34 to 36, respectively, and each of the regulation valves 34 to 36 is controlled to change the aperture by the mixing ratio changer 33. When the regulation valve 34 is opened, the flow rate of light cycle oil (LCO) flowing from the LCO tank 13 into the mixer 16 increases, and when the regulation valve 34 is tightened, the flow rate of light cycle oil (LCO) decreases.

Similarly, when the regulation valve 35 is opened, the flow rate of gas-to-liquid oil (GTL) flowing from the GTL tank 14 into the mixer 16 increases, and when the regulation valve 35 is tightened, the flow rate of gas-to-liquid oil (GTL) decreases. When the regulation valve 36 is opened, the flow rate of water flowing from the fresh water tank 15 into the mixer 16 increases, and when the regulation valve 36 is tightened, the flow rate of water decreases.

Now, the control area boundary information and preparation area boundary information will be described. FIG. 5 is a conceptual diagram illustrating the concepts of a control area boundary and a preparation area boundary. As illustrated in FIG. 5, a control area 41, where emission of NOx and SOx is strictly controlled, is set around land 40 (specifically, the North American continent, for example) as a living area for humans. A "non-control area", specifically, an area where emission limitation for NOx and SOx is lax lies out of the control area 41. Herein, a zonal area connecting to the control area 41 in the "non-control area" is referred to as preparation area 42. "Preparation area" refers to an area where preparation for change of a fuel composition (e.g., change from the fuel composition of Example 1 to the fuel composition of Example 3) to be used by the ship 10 which is to move into the control area 41 is performed. An area lying out of the preparation area 42, in other words, an area composed by excluding the preparation area 42 from the "non-control area" is referred to as global area 43. The border line between the control area 41 and the preparation area 42 is referred to as control area boundary 44, and the border line between the preparation area 42 and the global area 43 is referred to as preparation area boundary 45.

A mixing ratio change program configured to execute a process as illustrated in FIG. 6 is installed in the mixing ratio changer 33, and the mixing ratio changer 33 executes the program, for example, every 2 minutes. Now, the process by the program will be described with reference to FIG. 6.

On execution of the mixing ratio change program, the mixing ratio changer 33 reads information on the current position of the ship 10 from the position information acquisition unit 32. Subsequently, the mixing ratio changer 33 compares the information on the current position of the ship 10 read from the position information acquisition unit 32 with the control area boundary information stored in the electronic chart unit 31.

If the ship 10 is determined to be located in the inside of the control area boundary 44, in other words, the ship 10 is determined to be located in the control area 41 (step S1: Yes) from the result of the comparison between the current position information and the control area boundary information, then the program proceeds to the step S2 to select "Example 3", and the process is terminated. Selecting "Example 3" means controlling the aperture of each of the regulation valves 34 to 36 so that the fuel composition of Example 3 is formed in the mixer 16.

If the ship 10 is determined not to be located in the control area 41 in the step S1 (step S1: No), then the program proceeds to the step S3 to compare the information on the current position of the ship 10 with the preparation area boundary information stored in the electronic chart unit 31. If the ship 10 is determined to be located out of the preparation area boundary 45, in other words, the ship 10 is determined to be located in the global area 43 (step S3: Yes) from the result, then the program proceeds to the step S4 to select "Example 1", and the process is terminated. Selecting "Example 1" means controlling the aperture of each of the regulation valves 34 to 36 so that the fuel composition of Example 1 is formed in the mixer 16.

If the ship 10 is determined not to be located in the global area 43 in the step S3 (step S3: No), then the program proceeds to the step S5. Since the ship 10 is located neither in the control area 41 nor in the global area 43 in this case, it follows that the ship 10 is located in the preparation area 42. In the step S5, the direction of travel of the ship 10 is determined. Specifically, whether the ship 10 is moving in the direction such that the ship 10 is approaching to the control area 41 (the direction of entering the control area 41) or the ship 10 is moving in the direction such that the ship 10 is leaving the control area 41 (the direction of exiting the control area 41) is determined. The determination of the direction of travel is performed through comparison between the current position information acquired in the last execution (i.e., the execution 2 minutes before) of the mixing ratio change program and the current position information currently acquired.

If the ship 10 is determined to be moving in the direction of entering the control area 41 in the step S5, then the program proceeds to the step S2 to select "Example 3", and the process is terminated. If the ship 10 is determined to be moving in the direction of exiting the control area 41, on the other hand, then the program proceeds to the step S4 to select "Example 1", and the process is terminated.

Since the automatic fuel composition-switching system 30 is configured as described above, the fuel composition of Example 3 is formed in the mixer 16 when the ship 10 is located in the control area 41. That is, a fuel composition complying with emission control for air pollutants in the control area 41 is formed. When the ship 10 is located in the global area 43, the fuel composition of Example 1 is formed in the mixer 16. That is, a fuel composition acceptable for use in the global area 43 is formed.

When the ship 10 is to move from the global area 43 into the control area 41, the fuel composition to be formed in the mixer 16 is changed to the fuel composition of Example 3 in the preparation area 42. That is, the fuel composition to be formed in the mixer 16 is changed to a fuel composition complying with emission control for air pollutants in the control area 41 before the ship 10 enters the control area 41. When the ship 10 is to move from the control area 41 into the global area 43, the fuel composition to be formed in the mixer 16 is changed to the fuel composition of Example 1 on arrival in the preparation area 42. That is, the fuel composition to be formed in the mixer 16 is changed to a fuel composition acceptable for use in the global area 43 after the ship 10 exits the control area 41.

In this way, the automatic fuel composition-switching system 30 can automatically change the fuel composition to be formed in the mixer 16 according to the area where the ship 10 is located. Specifically, a fuel composition complying with emission control for air pollutants in the control area 41 is automatically fed into the diesel engine 12 when the ship 10 is located in the control area 41, and a relatively inexpensive fuel composition acceptable for use in the global area 43 is automatically fed into the diesel engine 12 when the ship 10 is located in the global area 43.

As described above, the present invention can resolve the significantly poor ignitability of water emulsion fuel containing light cycle oil (LCO) as a primary component through composing water emulsion fuel by adding gas-to-liquid oil (GTL) and water to light cycle oil (LCO) followed by mixing and stirring. For this reason, the fuel composition according to the present invention can be used as a main fuel for conventional diesel engines including no pilot injector.

Since light cycle oil (LCO) has a small content ratio of sulfur and gas-to-liquid oil (GTL) is almost free of sulfur, a ship using the fuel composition according to the present invention as a main fuel for a propulsion engine can comply with emission control for sulfur oxides (SOx) with ease. The fuel composition according to the present invention is water emulsion fuel, and hence the combustion temperature when the fuel composition according to the present invention is burned in a combustion chamber of a diesel engine can be set low. As a result, the formation and emission of nitrogen oxides (NOx) is reduced. Accordingly, a ship using the fuel composition according to the present invention as a main fuel for a propulsion engine can comply with emission control for nitrogen oxides (NOx) with ease.

In addition, the automatic fuel composition-switching system according to the present invention can automatically select the characteristics of a fuel to be used for a ship according to an area where the ship is located. Specifically, fuel complying with emission control is automatically selected when the ship is located in an area where emission of air pollutants is strictly controlled, and a relatively inexpensive fuel acceptable for use in a non-control area is automatically selected when the ship is located in a non-control area.

The above embodiments are examples of specific embodiments of the present invention, and the technical scope of the present invention is not limited to the above embodiments in any way. The present invention may be implemented with arbitrary modification or refinement, without departing from the technical spirit shown in the appended claims.

For example, the characteristics of the light cycle oil (LCO) and gas-to-liquid oil (GTL) listed in Table 1 are examples. The technical scope of the present invention is not limited to Table 1 in any way.

The mixing ratios of the light cycle oil (LCO), the gas-to-liquid oil (GTL), and water shown in the above embodiments are examples. The technical scope of the present invention is not limited to the fuel compositions having the exemplified mixing ratios in any way.

In general, the combustion temperature of water emulsion fuel is lowered as a larger quantity of water is added, and hence the concentration of nitrogen oxides (NOx) in the exhaust gas is lowered. In the above embodiments, the concentration of nitrogen oxides (NOx) in the exhaust gas is similarly lowered as the quantity of addition of water is increased as 50% by mass (Example 1), 70% by mass (Example 2), and 100% by mass (Example 3). Accordingly, the concentration of nitrogen oxides (NOx) in the exhaust gas is expected to be further lowered if a still larger quantity of water is added.

In general, the ignitability of water emulsion fuel is degraded as a larger quantity of water is added. In view of this, in the above embodiments, the quantity of addition of the gas-to-liquid oil (GTL) is set to as high as 50% by mass for Example 3 to maintain the ignitability, in contrast to 30% by mass for Examples 1 and 2. Even in a case where water in a quantity over 100% by mass is added, the ignitability is probably maintained through addition of a larger quantity of gas-to-liquid oil (GTL).

An additive not recited in the appended claims, such as an emulsifier, may be added to the fuel composition according to the present invention.

The application of the fuel composition according to the present invention is not limited to a diesel fuel. The fuel composition according to the present invention can be used even as a boiler fuel.

The ship according to the present invention is not limited to the ships 10 exemplified in FIGS. 2 and 3 in any way. Specifically, the ship according to the present invention is not limited to the ship 10 including the mixer 16. For example, the fuel composition according to the present invention produced in advance in a plant on land may be installed in a ship and used as a fuel for a propulsion engine of the ship.

The buffer tank 21 in the ship according to the present invention is an optional component. For example, the buffer tank 21 is not required if the production (discharge) rate of the fuel composition in the mixer 16 is controlled so as to increase or decrease according to increase or decrease in the consumption rate of the fuel composition in the diesel engine 12.

The mixer 16 can be disposed in an arbitrary compartment in the ship according to the present invention. The mixer 16 may be disposed in a compartment for the diesel engine 12, namely, an engine room, or in a compartment being not an engine room.

Each of the tanks (the LCO tank 13, the GTL tank 14, the fresh water tank 15, and the mixed oil tank 23) can be arbitrarily disposed in the ship according to the present invention. Tanks are generally disposed in the bottom of a ship (double bottom) or the side of a ship (an interspace between the outer side shell and inner side shell of a ship), but the position of each tank is not limited thereto.

The hardware configuration of the automatic fuel composition-switching system 30 illustrated in FIG. 4 and the process by the mixing ratio change program illustrated in FIG. 6 are examples, and the technical scope of the present invention is not limited thereto in any way. Specific configurations of the hardware and software are arbitrary. Although the mixing ratio change program is executed every 2 minutes in the above description of the embodiments, the frequency of execution of the mixing ratio change program is arbitrary. For example, the frequency of execution may be determined according to the ship speed. Specifically, the frequency of execution may be increased when the ship speed is high and decreased when the ship speed is low.

The width of the preparation area 42 illustrated in FIG. 5 is arbitrary. A width such that change of the fuel composition can be completed while the ship 10 is passing through the preparation area 42 can be suitably selected for the width of the preparation area 42. For example, the width of the preparation area 42 can be suitably set with consideration of the fuel consumption rate of the diesel engine 12 and the capacity of the buffer tank 21 so that the fuel composition of Example 1 stored in the buffer tank 21 on entering of the ship 10 into the preparation area 42 can be completely consumed in the preparation area 42. Alternatively, the capacity of the buffer tank 21 may be set so that the fuel composition of Example 1 stored in the buffer tank 21 on entering of the ship 10 into the preparation area 42 can be completely consumed in the preparation area 42.

The ship according to the present invention is not limited to merchant ships. The ship according to the present invention may be a passenger ship, a fishing boat, or another type of ship such as a special ship and a ship for a government or ministries.

Although use of the fuel composition according to the present invention as a fuel for the diesel engine 12 to drive the propeller 11 of the ship 10, in other words, a propulsion engine (main engine) of the ship 10 is exemplified in the above embodiments, the application of the fuel composition according to the present invention is not limited to a fuel for a main engine of a ship in any way. The fuel composition according to the present invention can be used as a fuel for an auxiliary engine of a ship, specifically, a generator or the like, or a fuel for a plant placed on land.

The present application claims the priority based on Japanese Patent Application No. 2015-163229 filed on Aug. 20, 2015, and including the specification, claims, drawing, and abstract. The contents disclosed in the original patent application are totally incorporated herein by reference.

INDUSTRIAL APPLICABILITY

The present invention is useful for a fuel composition, a ship, and an automatic fuel composition-switching system.

REFERENCE SIGNS LIST

1 RCEM
2 cylinder
3 fuel injection valve
4 intake valve
5 compressed air tank
6 pipeline
7 inspection window
10 ship
11 propeller
12 diesel engine
13 LCO tank
14 GTL tank
15 fresh water tank
16 mixer
17-20 pipeline
21 buffer tank
22 pipeline
23 mixed oil tank
30 automatic fuel composition-switching system
31 electronic chart unit
32 position information acquisition unit
33 mixing ratio changer
34, 35, 36 regulation valve
40 land
41 control area
42 preparation area
43 global area
44 control area boundary
45 preparation area boundary

The invention claimed is:

1. A fuel composition prepared by adding gas-to-liquid oil and water to light cycle oil to conduct emulsification, wherein a content of the gas-to-liquid oil is 30% or more based on a total mass of the light cycle oil and the gas-to-liquid oil.

2. The fuel composition according to claim 1, wherein a content of the water is 50% or more based on a total mass of the light cycle oil and the gas-to-liquid oil.

3. A fuel composition prepared by adding gas-to-liquid oil and water to light cycle oil to conduct emulsification, wherein a content of the water is 70% or more based on a total mass of the light cycle oil and the gas-to-liquid oil.

4. A ship using the fuel composition according to claim 1 as a fuel for a propulsion engine.

5. The ship according to claim 4, comprising:
tanks configured to store the water, the light cycle oil, and the gas-to-liquid oil, respectively; and a mixer configured to mix the water, the light cycle oil, and the gas-to-liquid oil fed from the respective tanks to produce the fuel composition.

6. The ship according to claim 4, comprising:
a tank configured to store the water;
a tank configured to store a mixed oil prepared by mixing the light cycle oil and the gas-to-liquid oil; and
a mixer configured to mix the water and the mixed oil fed from the respective tanks to produce the fuel composition.

7. An automatic fuel composition-switching system to be installed in a ship, wherein the ship uses a fuel composition prepared by adding gas-to-liquid oil and water to light cycle oil to conduct emulsification as a fuel for a propulsion engine, and wherein the ship comprises tanks configured to store the water, the light cycle oil, and the gas-to-liquid oil, respectively, and a mixer configured to mix the water, the light cycle oil, and the gas-to-liquid oil fed from the respective tanks to produce the fuel composition, the automatic fuel composition-switching system comprising:
an electronic chart unit storing control area boundary information indicating a location of a border between a control area where emission of air pollutants is more strictly controlled than a non-control area, and the non-control area;
a position information acquisition unit configured to acquire information on a current position of the ship; and
a mixing ratio changer configured to select a first fuel composition at least complying with emission control for air pollutants in the control area or a second fuel composition acceptable for use in the non-control area and form the selected fuel composition in the mixer by changing a mixing ratio of a raw material oil and water in the mixer, wherein
the mixing ratio changer compares the information on the current position of the ship acquired by the position information acquisition unit and the control area boundary information stored in the electronic chart unit, and forms the first fuel composition in the mixer in a case where the ship is located in the control area and forms the second fuel composition in the mixer in a case where the ship is located in the non-control area.

8. The automatic fuel composition-switching system according to claim 7, wherein the mixing ratio changer changes a fuel composition formed in the mixer to the first fuel composition before the ship enter the control area when the ship is to move from the non-control area into the control area, and to the second fuel composition after the ship exits the control area when the ship is to move from the control area to the non-control area.

9. A ship comprising the automatic fuel composition-switching system according to claim 7 installed therein.

10. Use of a fuel composition according to claim 1 as a fuel for a diesel engine.

11. The fuel composition according to claim 1, wherein a content of the water is 50% or more based on a total mass of the light cycle oil and the gas-to-liquid oil.

12. A fuel composition prepared by adding gas-to-liquid oil and water to light cycle oil to conduct emulsification, wherein a content of the gas-to-liquid oil is 30% or more based on a total mass of the light cycle oil and the gas-to-liquid oil, wherein a content of the water is 70% or more based on a total mass of the light cycle oil and the gas-to-liquid oil.

13. The fuel composition according to claim 1, as a fuel for a propulsion engine.

14. A ship using the fuel composition according to claim 2 as a fuel for a propulsion engine.

15. A ship using the fuel composition according to claim 3 as a fuel for a propulsion engine.

16. A ship using the fuel composition according to claim 11 as a fuel for a propulsion engine.

17. A ship using the fuel composition according to claim 12 as a fuel for a propulsion engine.

18. The ship according to claim 13, comprising:
tanks configured to store the water, the light cycle oil, and the gas-to-liquid oil, respectively; and
a mixer configured to mix the water, the light cycle oil, and the gas-to-liquid oil fed from the respective tanks to produce the fuel composition.

19. The ship according to claim 14, comprising:
tanks configured to store the water, the light cycle oil, and the gas-to-liquid oil, respectively; and
a mixer configured to mix the water, the light cycle oil, and the gas-to-liquid oil fed from the respective tanks to produce the fuel composition.

* * * * *